Jan. 19, 1932.  C. BROTHERTON  1,842,146
VALVE FOR REGULATING THE FLOW OF FLUIDS

Original Filed Feb. 29, 1928

Inventor:
Clifford Brotherton
by Monroe E. Miller
Atty.

Patented Jan. 19, 1932

1,842,146

UNITED STATES PATENT OFFICE

CLIFFORD BROTHERTON, OF BRIGHOUSE, ENGLAND, ASSIGNOR, BY MESNE ASSIGNMENTS, TO I. P. MORRIS & DE LA VERGNE, INCORPORATED, A CORPORATION OF DELAWARE

VALVE FOR REGULATING THE FLOW OF FLUIDS

Application filed February 29, 1928, Serial No. 257,995, and in Great Britain March 2, 1927. Renewed November 21, 1930.

The invention relates to flow control valves of the type in which a body of circular section surrounds an internal cylinder spaced from the body by radial ribs to form an annular waterway, such cylinder being closed at one end and having working within it a hollow plunger provided with a tapered nose adapted to seat itself upon a contracting part of the body to close the valve.

It is known in a valve of this description to provide means, for operating or moving the plunger, comprising an internal rack member connected with the plunger, said rack meshing with a pinion on a shaft which extends to the exterior of the body, and is there provided with worm gearing to enable it to be turned.

The present invention has for its object to provide improved means whereby, before any movement of the plunger takes place, the interior of the cylinder and hollow plunger will be placed into communication either with a supply of pressure liquid or with a region of low pressure, so that movement of the plunger in the desired direction will be facilitated.

The invention is characterized in that the worm of the external worm gear referred to is arranged to be capable, along with its shaft, of a certain amount of axial travel so that at each reversal of rotation of the worm it will travel idly along the teeth of its co-operating worm wheel, as along a fixed rack. The axial travel or lost motion of the worm thus obtained is utilized to operate a two-way valve, controlling communication between the interior of the cylinder and hollow plunger, and the pressure supply or the region of low pressure respectively, so that when the worm is turned in a valve-opening direction the interior of the cylinder and plunger will be connected to the region of low pressure, and when turned in the opposite direction pressure fluid will be admitted to the interior of the cylinder and plunger, the change-over of the pressure connections being made in each case before the worm, owing to arrest of its axial travel, becomes operative to turn its co-operating worm wheel and thereby effect movement of the plunger.

By the provision of means such as described the movement of the plunger is assisted, or facilitated, whilst the plunger is absolutely "dead-beat", that is to say no free movement of the plunger is possible at any time.

The accompanying drawings illustrate a valve embodying the invention.

Figure 1:
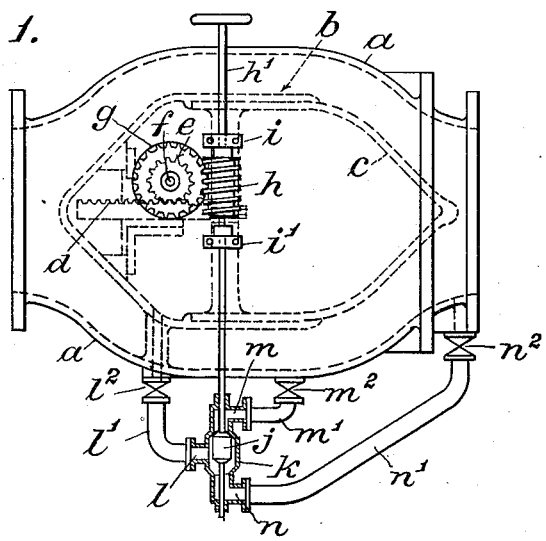

Fig. 1 showing the valve open, and

Figure 2:
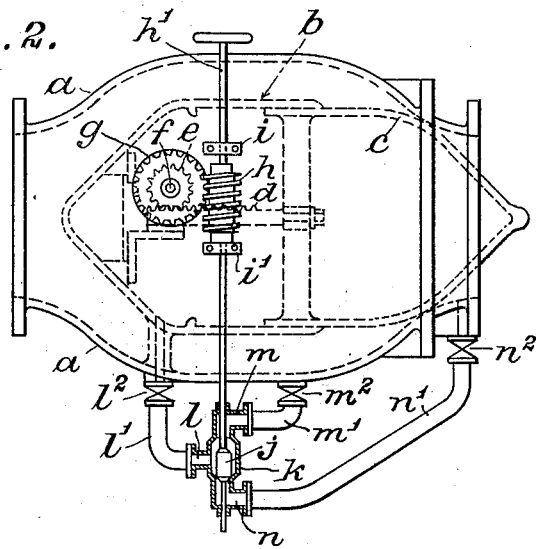

Fig. 2 showing it closed.

Referring to the drawings, $a$ represents the valve casing or body, $b$ the internal cylinder, and $c$ the hollow plunger having connected to it the rack member $d$, which meshes with an internal pinion $e$ on a shaft $f$ extending to the exterior of the body and carrying, externally of the body, a worm wheel $g$ by which the shaft $f$ may be rotated.

According to the invention, the shaft $h'$ of a worm $h$, for driving the worm wheel $g$, passes through two bearings $i$ and $i'$ spaced apart at a distance suitably greater than the length of the worm. One end of the shaft carries or is connected to a valve member $j$ working in a casing $k$ provided with three ports $l$, $m$, and $n$. The port $l$ is connected by a pipe $l'$ with the interior of the internal cylinder $b$, the port $m$ is connected by a supply pipe $m'$ with the waterway of the valve on the upstream side of the seating, and the port $n$ is connected by a discharge pipe $n'$ with the waterway, or pipe line, below the seating. The disposition of the ports $l$, $m$, and $n$ and of the valve member $j$ is, as shown, such that in one position of the valve member communication is opened up between the interior of the cylinder and plunger and the waterway above the seating, whilst in the other position of the valve member the pressure inlet or supply connection $m'$ is shut off and the interior of the cylinder and plunger is placed into communication with the pipe line below the seating.

Assuming the valve to be open as shown in Fig. 1, the actuating worm is at one limit of its axial travel and the valve member $j$ is in the position to connect the interior of the cylinder and plunger to the region of low pressure. If the worm $h$ is turned in a direction to close the valve, it first travels idly to the opposite limit of its axial movement, and in so doing moves the valve member to the position shown in Fig. 2, in which the port $n$ is closed and the port $m$ opens. When, therefore, the worm reaches the end of its idle travel and becomes operative to move the plunger, the inlet pressure acting within the cylinder and plunger reduces the effort required. Similarly, when opening the valve, the initial effect of operation of the actuating worm is to connect the interior of the cylinder and plunger to the region of low pressure, which reduces the opening effort necessary. It is thus seen that in either the opening or closing operations the valve control has provision whereby the valve $j$ is operated prior to the mechanical actuation of the plunger.

Stop valves $l^2$, $m^2$, and $n^2$ are provided in the pipes $l'$, $m'$, and $n'$ respectively, to enable the casing $k$ to be isolated when required.

Although I have shown a sliding valve for changing over the pressure connections, it will be obvious that the "lost motion" of the actuating worm may be utilized to effect turning of a rotary valve or cock.

Means of any suitable description will preferably be provided whereby the worm $j$ can, when desired, be locked against axial movement, so that there will be no lost motion between commencement of actuation of the worm and its operative effects on the plunger. Such provision will enable the valve to be used, say, for throttling flow in cases where the inlet side of the valve is subject to pressure and the outlet side is under reduced or atmospheric pressure, causing relatively high flow velocity through the valve, as for instance at an outlet from a dam or pressure conduit. The means referred to may take conveniently the form of a part adapted to be inserted between one end of the worm and the adjacent fixed bearing $i$ or $i''$.

Having thus described my invention, what I claim as new and desire to secure by Letters Patent is:—

1. A valve of the chaacter described comprising a casing, a cylinder therein, a plunger slidable in the cylinder and controlling the flow through said casing, a shaft mounted in the casing and having a rack and pinion connection with the plunger, a worm wheel on the shaft, a worm engaging said wheel and mounted for limited longitudinal sliding movement, connections between the cylinder and the high and low pressure regions of the casing, and a valve member controlling the flow through said connections between the cylinder and the high and lower pressure regions of the casing and connected to the worm to be reversed in the initial rotation of the worm in opposite directions.

2. A valve mechanism comprising inner and outer casings spaced to form a relatively smooth annular fluid passageway therebetween, a plunger telescoping with said inner casing to form an internal fluid pressure chamber and adapted to cooperate with said other casing to control fluid flow through the valve mechanism, and means for controlling the operation of said plunger including a fluid pressure supply passage for said internal chamber, a discharge passage, control valve means for controlling said passages located externally of said outer casing, and means for mechanically operating said plunger and operating said control valve means so that during normal pressure conditions of the flow through the valve mechanism, said control valve means operates prior to mechanical actuation of the plunger.

3. A valve mechanism comprising in combination, inner and outer casing spaced to form a relatively smooth annular fluid passageway therebetween, a plunger telescoping with said inner casing to form an internal fluid pressure chamber therewith and adapted to have seating engagement with said outer casing to prevent fluid flow through the valve mechanism, said plunger and inner casing having their walls which are exposed to fluid flow through the valve mechanism entirely closed, fluid pressure supply and discharge passages for said internal chamber, valve means for controlling said passages, and means for mechanically actuating said plunger and for controlling said valve means, said mechanical actuating means having provision whereby the control valve for said supply and discharge passages is operated prior to mechanical actuation of the plunger.

4. A valve mechanism comprising in combination inner and outer casings spaced to form a relatively smooth annular fluid passageway therebetween, a plunger telescoping with said inner casing to form an internal fluid pressure chamber therewith and adapted to have seating engagement with said outer casing to prevent fluid flow through the valve mechanism, said plunger and inner casing having their walls which are exposed to fluid flow through the valve mechanism entirely closed, fluid pressure supply and discharge passages for said internal chamber disposed externally of said outer casing and having connections with said annular fluid passageway at points up and downstream of the seat thereof, valve means for controlling said passages, and means for mechanically actuating said plunger and for controlling said valve means, said mechanical actuating means having provision whereby the control valve for said supply and discharge passages is operated prior to mechanical actuation of the plunger.

5. A valve mechanism comprising, in combination, a casing having a valve seat, a second casing, a plunger slidably supported by said second casing to form a fluid pressure chamber and adapted to engage said seat, and means for effecting both mechanical and fluid pressure operation of said plunger including fluid pressure supply and discharge passages and control valve mechanism for controlling both of said latter passages and operatively connected to said plunger for movement in a direction transverse to that of said plunger.

6. A valve mechanism comprising, in combination, a casing having a valve seat, a second casing, a plunger slidably supported by said second casing to form a fluid pressure chamber and adapted to engage said seat, and means for effecting both mechanical and fluid pressure operation of said plunger including fluid pressure supply and discharge passages and control valve mechanism for said passages, disposed externally of said valve seat casing, said control valve mechanism having provision for controlling said passages automatically prior to mechanical actuation of the plunger.

In testimony whereof I affix my signature.

CLIFFORD BROTHERTON.